M. TÜLLMANN.
LUBRICATING DEVICE FOR THE SHAFT BEARINGS OF ROTARY PUMPS.
APPLICATION FILED DEC. 3, 1920.
1,372,576.
Patented Mar. 22, 1921.
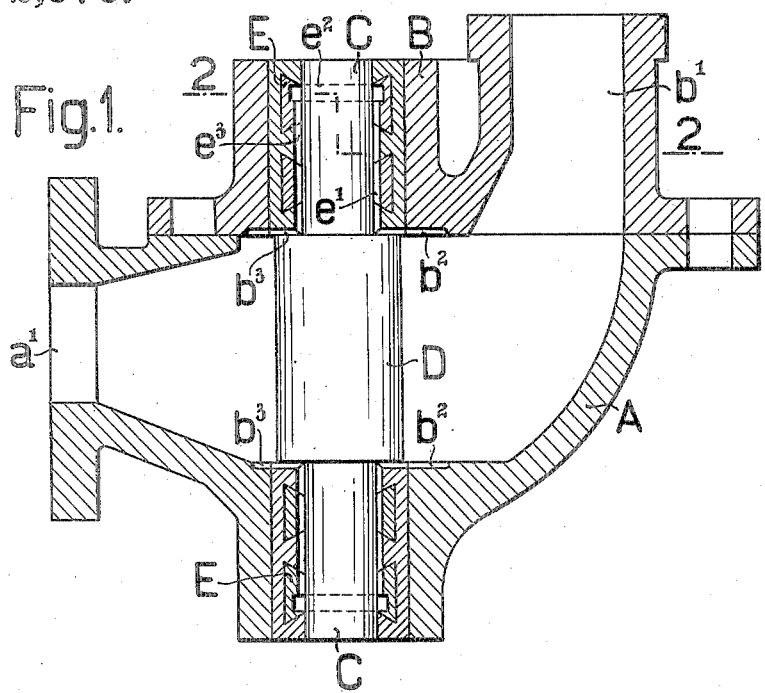
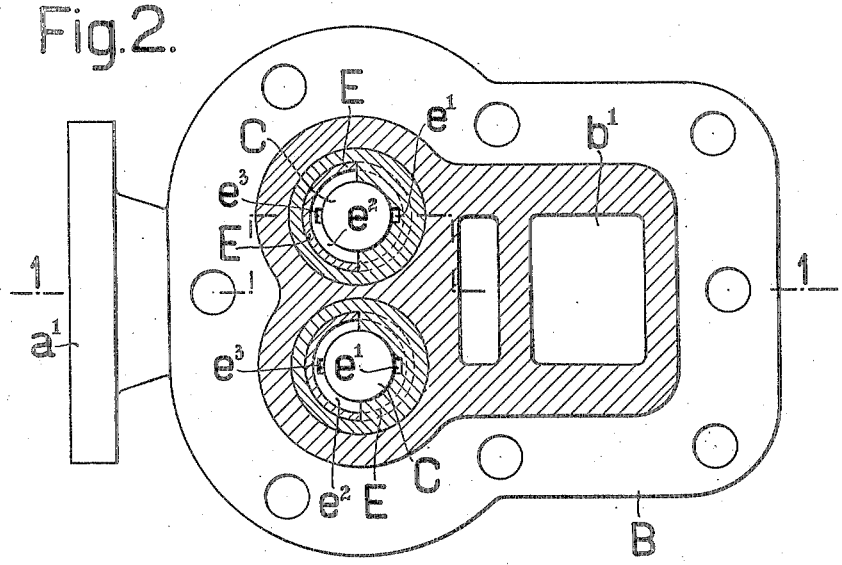
Inventor
Max Tüllmann
By Knight Bros
Attys

UNITED STATES PATENT OFFICE.

MAX TÜLLMANN, OF KIEL, GERMANY, ASSIGNOR TO FRIED. KRUPP AKTIENGESELLSCHAFT GERMANIWERFT, OF KIEL-GAARDEN, GERMANY.

LUBRICATING DEVICE FOR THE SHAFT-BEARINGS OF ROTARY PUMPS.

1,372,576.  Specification of Letters Patent.  Patented Mar. 22, 1921.

Application filed December 3, 1920. Serial No. 428,091.

*To all whom it may concern:*

Be it known that I, MAX TÜLLMANN, residing at Kiel, Germany, a citizen of the German Republic, have invented certain new and useful Improvements in Lubricating Devices for the Shaft-Bearings of Rotary Pumps, of which the following is a specification.

My invention relates to a lubricating device for the shaft bearings of rotary pumps destined for the delivery of oil or the like, and it essentially resides in the feature of the suction and the delivery chamber of the pump being interconnected across the guide faces of the bearings in suchwise as to secure an automatic and uninterrupted lubrication of the shaft bearings of the pump by the oil or the like, delivered, and while the pump is working.

An embodiment of the subject matter of my invention is shown by way of example in the accompanying drawing, in which:

Figure 1 is a vertical longitudinal section, taken along the broken line 1—1 in Fig. 2, through a gear-driven pump constructed in accordance with this invention, and Fig. 2 a horizontal section along the broken line 2—2 in Fig. 1.

At the casing A there is arranged a connecting branch $a^1$ for the purpose of establishing communication with the suction piping, while a similar branch $b^1$ is disposed at the cover B and serves to establish connection with the delivery piping. The shafts C, supporting the delivery wheels D, are lodged in bushes E within the casing A and the cover B, respectively; said bushes being lined with white lead. The inner face of each of said bushes E is slotted to form two oppositely disposed longitudinal conduits $e^1$, $e^3$, intercommunicating at one end by the intervention of an annular conduit $e^2$. The conduit $e^1$ is moreover connected at its opposite end by a radially disposed conduit $b^2$ with the delivery chamber of the pump, and in a like manner the conduit $e^3$ is in communication with the suction chamber of the pump by the aid of a conduit $b^3$.

The operation of the device will be readily understood by reference to the drawing, and may be stated to be as follows:

In the course of the rotation effected by the pump a small portion of the liquid delivered (oil or other) is forced, in consequence of the pressure reigning in the delivery chamber, through the conduits $b^2$, $e^1$, into the annular conduit $e^2$, whence it is redrawn into the suction chamber by the conduits $e^3$, $b^3$, which communicate with said chamber, while at the same time, owing to the rotation of the shafts C, a portion of the lubricating means is withdrawn from the conduits $e^1$, $e^3$ and conducted to the guide faces. In order to secure a perfectly satisfactory lubrication of the bearings for their entire length, it will be found expedient to arrange the annular conduits $e^2$ as closely as possible to the outlets for the shafts arranged in the pump-casing.

As long as the annular conduits $e^2$ are filled with liquid (oil or the like), it will be impossible for air to penetrate the suction space of the pump, and this is a condition which may be readily secured by simply making the cross section of the suction conduits $e^3$, $b^3$ somewhat smaller than that of the delivery conduits $b^2$, $e^1$.

What I claim is:

1. A lubricating device for shaft bearings of rotary pumps comprising a shaft, bearings for said shaft, the guide faces of said bearings being provided with conduits providing communication between the delivery and suction chambers of the pump.

2. A lubricating device for shaft bearings of rotary pumps having delivery and suction chambers and shafts, bearings for said shafts, the guide faces of said bearings being provided with oppositely disposed longitudinal conduits and means providing communication between one of said conduits and the suction chamber and the other of said conduits with the delivery chamber of the pump.

3. A lubricating device for shaft bearings of rotary pumps having a delivery and suction chamber and shafts, comprising bearings for said shafts, the guide faces of said bearings being provided with longitudinally disposed conduits, means for providing communication between said conduits and the suction and delivery chambers of the pump and an annular conduit formed in the guide face of said bearings providing communication between the longitudinally disposed conduits.

4. A lubricating device for the shaft bearings of rotary pumps provided with a delivery and suction chamber and rotary shafts comprising bearings for said shaft, two oppositely disposed longitudinal conduits formed in the guide faces of each bearing, means establishing communication between one of said conduits and the suction chamber and the other of said conduits and the delivery chamber of the pump and an annular conduit formed in the guide face of said bearing, close to the outer end thereof, said annular conduit providing communication between said longitudinally disposed conduits.

The foregoing specification signed at Kiel, Germany, this 19th day of June, 1920.

MAX TÜLLMANN.

In presence of—
PAUL DIETRICH,
F. GUDIMAT.